United States Patent [19]

Yamada et al.

[11] Patent Number: 4,826,737

[45] Date of Patent: May 2, 1989

[54] METHOD OF USING ALUMINUM ALLOY AS SUBSTRATE FOR MAGNETIC DISCS WITH ENHANCED MAGNETIC RECORDING DENSITY

[75] Inventors: Kazuo Yamada, Mishima; Masahiro Tsuchiya; Hideaki Kakita, both of Susono; Reijiro Maruyama, Tokyo; Yoshinobu Okada, Numazu; Yo Takeuchi, Susono, all of Japan

[73] Assignee: Mitsubishi Aluminum Kabushiki Kaisha, Tokyo, Japan

[21] Appl. No.: 882,632

[22] Filed: Jul. 7, 1986

Related U.S. Application Data

[63] Continuation-in-part of Ser. No. 633,387, Oct. 22, 1984, abandoned.

[30] Foreign Application Priority Data

Apr. 15, 1983 [JP] Japan ................................. 58-66789
Apr. 18, 1983 [JP] Japan ................................. 58-68054

[51] Int. Cl.$^4$ .............................................. C22F 1/04
[52] U.S. Cl. ........................................ 428/650; 148/2; 148/11.5 A; 148/31.5; 428/654
[58] Field of Search ................... 148/2, 11.5 A, 31.5; 428/650, 654

[56] References Cited

U.S. PATENT DOCUMENTS 2,245,167 6/1941 Stroup ................................ 148/439
4,412,870 11/1983 Vernam et al. ................. 148/11.5 A
4,431,461 2/1984 Hoshino et al. ............... 148/11.5 A Primary Examiner—Melvyn J. Andrews
Attorney, Agent, or Firm—Frishauf, Holtz, Goodman & Woodward

[57] ABSTRACT

A substrate for a magnetic disc prepared from an aluminum alloy which consists essentially of from 3.0 to 5.0 percent, preferably from 3.5 to 4.5 percent, Mg, from 0.5 to 3.0 percent, preferably from 0.5 to 1.7 percent, Zn, and the balance Al and inevitable impurities. The inevitable impurities contain not more than 0.10 percent Si, not more than 0.10 percent Fe, not more than 0.01 percent Mn, not more than 0.01 percent Cr, not more than 0.01 percent Ni, and not more than 0.01 percent Ti.

The aluminum alloy substrate may also contain from 0.3 to 2.0 percent, preferably from 0.5 to 1.0 percent, Cu, and/or from 0.02 to 0.5 percent, preferably from 0.05 to 0.2 percent, Zr.

The aluminum alloy substrate for a magnetic disc has a structure wherein fine and uniform intermetallic compounds are present in the matrix metal, with almost no non-metallic inclusions present therein, and which has high hardness and high strength, thereby making it possible to provide a magnetic disc (1) having improved surface smoothness and (2) of reduced thickness. The disc substrate can be coated to provide high density magnetic recording.

13 Claims, 2 Drawing Sheets

METHOD OF USING ALUMINUM ALLOY AS SUBSTRATE FOR MAGNETIC DISCS WITH ENHANCED MAGNETIC RECORDING DENSITY

This application is a continuation-in-part application of application Ser. No. 663,387, filed Oct. 22, 1984, now abandoned.

BACKGROUND OF THE INVENTION

This invention relates to a method of using an aluminum alloy as a substrate for magnetic discs, and more particularly to a method of using an aluminum alloy as a substrate of this kind, which enables magnetic recording on the magnetic disc with enhanced density. This invention also provides an improved aluminum substrate for magnetic discs. This invention further provides an improved magnetic disc and a method of making said magnetic discs.

Conventional magnetic discs include a type comprising a substrate formed of an aluminum alloy, with a film of magnetic recording medium coated over the surface thereof. A typical example of this type substrate is formed of an aluminum alloy according to 5086 of AA (hereinafter called "Aluminum Alloy AA 5086"), which has a chemical composition of 0.20–0.70 % Mn, 3.5–4.5 % Mg, 0.05–0.25 % Cr, and the balance of Al and inevitable impurities.

In recent years there have been keenly desired magnetic discs which satisfy requirements of increased storage capacity, shortened access time, reduced storage cost per bit of information, and reduced weight. An essential requisite for a magnetic disc to meet such requirements is to increase the magnetic recoding density, e.g. the number of bits of information that can be stored in a given area of the magnetic disc (bit density).

To achieve increased magnetic recording density, the magnetic disc should have a smooth surface free of defects such as pinholes, with a reduced and uniform thickness of the maghetic recording medium film.

However, if the thickness of the magnetic recording medium film is reduced, the presence of coarse intermetallic compounds and non-metallic inclusions present in the substrate matrix will cause unevenness of the substrate surface and accordingly unevenness of the medium surface as well as occurrence of defects such as pinholes, resulting in the phenomenon that part of information to be recorded is actually not recorded in the magnetic disc, and other disadvantages. Therefore, the substrate should be free of such coarse intermetallic compounds and non-metallic inclusions. However, according to a substrate formed of Al Alloy AA 5086, although the non-metallic inclusions can be greatly reduced by means of filtration of the molten alloy metal during the casting step for the manufacture of the substrate, coarse intermetallic compounds are still present in the substrate matrix, thereby making it impossible to reduce the thickness of the magnetic recording medium film below a certain value.

As noted above, the surface smoothness of the magnetic disc will be improved in proportion to increase of the surface smoothness of the substrate. To this end, conventionally the substrate surface has been lapped into a mirror finish surface so as to achieve required smoothness. However, Al Alloy AA 5086 does not have satisfactory hardness enough to facilitate the polishing.

Furthermore, although the higher the strength of the substrate, the more easily the magnetic disc can be made thinner, and accordingly more compact in size and reduced in weight, Al Alloy AA 5086 does not have high strength enough to satisfy these requirements.

SUMMARY OF THE INVENTION

It is an object of the invention to provide a method of using an aluminum alloy as a substrate for magnetic discs, which alloy has a structure wherein fine and uniform intermetallic compounds are present in the metal matrix, with almost no non-metallic inclusions present in the matrix, thereby permitting reduction of the thickness of the magnetic recording medium film and accordingly enabling magnetic recording with higher density.

It is a further object of the invention to provide a method of using an aluminum alloy as a substrate for magnetic discs, which alloy has high hardness enough to facilitate lapping for mirror surface finishing, to thereby further enhance the magnetic recording density.

It is another object of the invention to provide a method of using an aluminum alloy as a substrate for magnetic discs, which alloy has high strength enough to permit designing the magnetic discs thinner, more compact in size and lighter in weight.

The present invention provides a method of using an aluminum alloy as a substrate for a magnetic disc, which alloy consists essentially of from 3.0 to 5.0 percent, preferably from 3.5 to 4.5 percent, Mg, from 0.5 to 3.0 percent, preferably from 0.5 to 1.7 percent, Zn, and the balance Al and inevitable impurities, wherein the inevitable impurities contain not more than 0.10 percent Si, not more than 0.10 percent Fe, not more than 0.01 percent Mn, not more than 0.01 percent Cr, not more than 0.01 percent Ni, and not more than 0.01 percent Ti.

The aluminum alloy substrate may further contain from 0.3 to 2.0 percent, preferably from 0.5 to 1.0 percent, Cu, and/or from 0.02 to 0.5 percent, preferably from 0.05 to 0.2 percent, Zr.

The aluminum alloy substrates for a magnetic disc are round, typically from about 3.5 to 14 inches in diameter with a central axial opening (donut-shaped) and between about 1.25 and 2 mm thick. These substrates should have a surface hardness (Vickers hardness) of from 60 to 105 and a surface roughness (Rmax) of 0.03 or less.

The magnetic discs of the present invention are prepared by working an ingot or slab or thicker sheet of said aluminum alloy to a thickness of 1.25–2.0 mm and then shaping and finishing to obtain the specified mirror finish surface (Rmax) of 0.03 or less. The magnetic disc of the present invention is prepared by coating the substrate of the present invention with a magnetic coating, as illustrated by the three methods discussed hereinafter.

DETAILED DESCRIPTION

Figure 1:
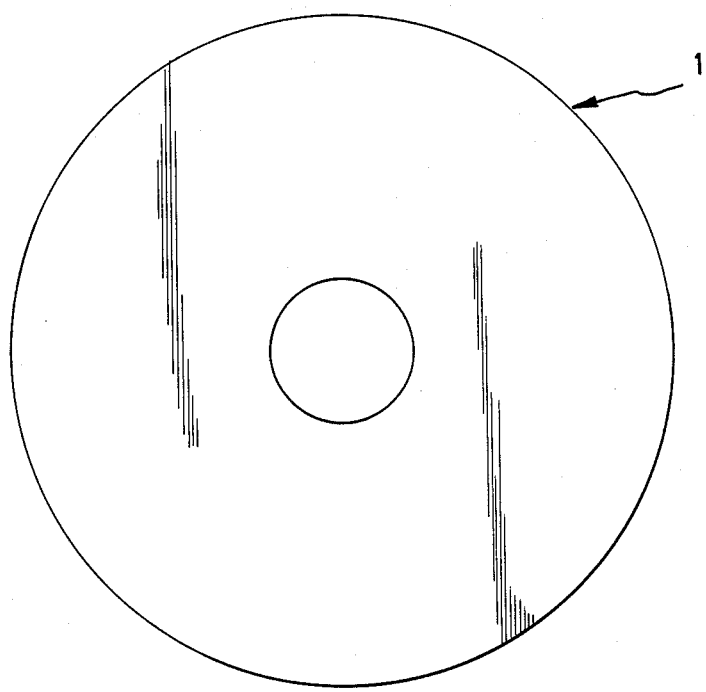
FIG. 1 is a plan view of the substrate for a magnetic disc.

Under the aforestated circumstances, the present applicants have made many studies in order to obtain an aluminum alloy substrate for magnetic discs, which has a structure wherein fine and uniform intermetallic compounds are present in the matrix while almost no non-metallic inclusions are present in the matrix, to thereby enable reduction of the thickness of the magnetic recording medium film, and which has satisfactorily high hardness and high strength enough to permit improving the surface smoothness of the magnetic disc as well as designing the magnetic disc thinner, more compact in size and lighter in weight. As a result, the applicants have reached the finding that a substrate formed of an aluminum alloy having the aforesaid chemical composition satisfies all the above requirements, and therefore, if used in a magnetic disc, it will achieve satisfactory magnetic recording density. Throughout the present specification percentages of the components are weight percentages.

The present invention is based upon the above finding. The contents of the component elements of the aluminum alloy used as a substrate for magnetic discs according to the invention are limited as previously stated, for the following reasons:

(a) Mg:

Mg is contained in aluminum alloys according to the invention in an amount from 3.0 to 5.0 percent. The Mg acts to greatly enhance the hardness and strength of the aluminum alloy substrate. If the Mg content is less than 3.0 percent, required grades of hardness and strength cannot be achieved, whereas in excess of 5.0 percent, it will result in degraded rollability of the resulting aluminum alloy substrate material, and also cause formation of coarse Al-Mg intermetallic compounds in the matrix. Thus, the Mg content has been limited to a range from 3.0 to 5.0. Preferably, the Mg content should be from 3.5 to 4.5 percent to achieve best hardness and strength properties.

(b) Zn:

Zn is contained in aluminum alloys according to the invention in an amount from 0.5 to 3.0 percent. The Zn acts to enhance the hardness of the aluminum alloys without formation of coarse intermetallic compounds in the matrix. If contained in less than 0.5 percent, desired hardness-enhancing results cannot be obtained. Whilst, if the Zn content exceeds 3.0 percent, it will result in deterioration of the castability and rollability of the resulting aluminum alloy substrate material. Therefore, the Zn content has been limited to a range from 0.5 to 3.0 percent. Preferably, it should be limited to a range from 0.5 to 1.7 to achieve best hardness-enhancing results.

(c) Cu:

Aluminum alloys of the invention may contain Cu in an amount from 0.3 to 2.0 percent. The Cu acts to further enhance the strength and hardness of the aluminum alloys, and also acts to further restrain coarsening of the Al-Mg intermetallic compounds. Therefore, Cu may be contained in the aluminum alloys of the invention according to necessity, in the case that such actions are strongly desired If contained in less than 0.3 percent, the above actions cannot be performed to desired extents, whereas in excess of 2.0 percent, it will result in degradation in the rollability and castability of the aluminum alloy substrate material, as well as in degradation in the corrosion resistivity thereof. Thus, the Cu content has been limited to a range from 0.3 to 2.0 percent. The preferable range should be from 0.5 to 1.0 percent.

(d) Zr:

Zr may further be contained in aluminum alloys of the invention in an amount from 0.02 to 0.5 percent. The Zr acts to make finer the crystal grains and intermetallic compounds in the aluminum alloys. Therefore, Zr may be contained in the aluminum alloy substrates of the invention particularly when such fining action is required. However, if the Zr content is below 0.02 percent, the fining action cannot be performed to a desired extent. Whilst, in excess of 0.5 percent, it will result in formation of coarse Al-Mg intermetallic compounds. Thus, the Zr content should be limited to a range from 0.02 to 0.5 percent. Best fining results can be obtained if the Zr content is from 0.05 to 0.2 percent.

(e) Si, Fe, Cu, Mn, Cr, Ni, and Ti as inevitable impurities:

All these elements act to form intermetallic compounds in the matrix. However, if the content of each of these elements exceeds the below-mentioned respective upper limit, coarse intermetallic compounds can be formed. Therefore, the upper limits of these contents of these elements have been defined as follows:

Si: 0.10 percent
Fe: 0.10 percent
Mn: 0.01 percent
Cr: 0.01 percent
Ni: 0.01 percent
Ti: 0.01 percent A method of using the above described aluminum alloy as a substrate for magnetic discs may comprise the following manufacturing steps:

(a) Preparing a molten aluminum alloy having a predetermined chemical composition within the above stated range according to the invention;
  (1) Degassing into the prepared molten Al alloy by means of at least one selected from the group consisting of a chlorine gas, a nitrogen gas, and an argon gas, and a degassing flux so that the gas content in the degassed molten Al alloy is less than 0.20cc/100g Al;
  (2) Filtrating the degassed molten Al alloy through a ceramic filter to remove non-metallic inclusions therefrom;
(b) Charging the filtered molten Al alloy into a mold at a temperature within a range from 690° to 740° C., to cast same into an ingot having a predetermined size (Direct Chill Casting);
(c) Heating the ingot up to a temperature within a range from 480° to 535° C., immediately followed by subjecting same to hot rolling into a hot rolled plate having a thickness within a range from 3.0 to 8.0 mm;
(d) Subjecting the hot rolled plate to cold rolling at a reduction ratio of at least 40 % into a cold rolled plate having a predetermined thickness;
(e) Stamping out a disc having a predetermined size from the cold rolled plate;
(f) Subjecting the disc to creep annealing by holding same under a pressure of at least 0.25 kg/cm2 and at a temperature within a range from 200° to 400° C.; and
(g) Subjecting the annealed disc to rough machining, followed by lapping to obtain a mirror finish surface.

Incidentally, at the step (g), the disc subjected to rough machining may be subjected to creep annealing under pressure at a temperature of 200°–350° C. before finish machining, if necessary.

The reason why the manufacturing condition is defined as above is as follows:

(1) Gas Amount (below 0.20cc/100g Al)

When the gas content in the molten Al alloy is high, physical platings such as ion-spattering and ion-plating have to be performed in manufacturing a magnetic disc from the Al alloy.

The physical plating is performed within a vacuum vessel within which the Al alloy is heated up to a temperature of about 200°–300° C. In such physical plating, if the gas content of the molten Al alloy is high, part of the gas is discharged into the vacuum space during the heating to degrade its degree of vacuum, resulting in a defective plated film. To prevent this disadvantage, the gas content of the molten Al alloy is to be limited below 0.20cc/100g Al.

(2) Casting Temperature (690°–740° C.)

If the casting temperature is below 690° C., the large-sized intermetallic compounds such as Al-Fe and Al-Fe-Si will be formed, resulting in the magnetic disc having a defective mirror finished surface. This defective mirror surface of the magnetic disc can cause formation of a defective magnetic film coated immediately following the mirror surface finishing. If the casting temperature is increased to a value higher than 690° C. and rapid cooling is performed, the sizes of the intermetallic compounds become smaller. However, if the alloys are cast at a temperature higher than 740° C., it can result in such defects as cracking and a high gas content in the ingot. Therefore, the casting temperature is limited within a range from 690° to 740° C.

(3) Soaking Temperature (480°–535° C.)

The ingot, if subjected to heat treatment at a temperature below 480° C., can have cracking during the hot rolling, resulting in a low rolling yield and thus a high production cost. On the other hand, when the ingot is heated above 535° C., even in an ordinary air heating furnace, partial melting (eutectic melting) of the ingot occurs, which can result in cracking in the ingot during the hot rolling. Therefore, the heating temperature is limited from 480° to 535° C.

(4) Cold Rolling Reduction Ratio

If the cold rolling reduction ratio is set to below 40 %, the crystal grains will be greater in size, whereby the orientation of the grains appreciably affect the surface machining ability and platability of the cold rolled plate to such an extent as to prevent formation of a smooth surface of the cold rolled plate.

(5) Creep Annealing Pressure

Creep annealing is performed in order to remove strains from a disc formed of the cold rolled plate to make it flat. To obtain a flat disc, annealing pressure, temperature and time should be set at respective suitable values. When the pressure is low, the annealing temperature is to be increased and the heating time is to be prolonged. In order to keep the annealing temperature and time within the respective suitable ranges, the annaling should be performed under a pressure of 0.25 kg/cm$^2$.

(6) Creep Annealing Temperature

If the creep annealing temperature is low, a long heating time is needed to obtain satisfactory surface smoothness of the disc. To obtain the smoothness economically, the heating temperature should be above 200° C. if the heating time is within a range from 4 to 16 hours, although it changes depending upon the pressure. On the other hand, heating above 400° C. can cause coarsening of the crystal grains. Therefore, the maximum heating temperature has been set to 400° C.

Next, the aluminum alloy substrate according to the invention will be described in further details with reference to the examples thereof.

EXAMPLES OF MAKING THE SUBSTRATE

Aluminum as the base metal having a purity of 99.7 percent or more available on the market was melted. Alloy-forming elements were added to the molten aluminum metal into molten aluminum alloys having chemical compositions shown in Table 1. Chlorine gas was blown into each molten aluminum alloy metal to degas same, followed by subjecting the molten metal to holding. Thereafter, each molten aluminum alloy metal was subjected to filtration through a ceramic filter to remove non-metallic inclusions from the molten alloy metal, and then subjected to direct-cooling continuous casting into an ingot having a size of 1,000 mm in width, 2,500 mm in length, and 600 mm in thickness. The ingot was held at a temperature within a range from 500° to 540° C. for a holding time of 12 hours, and then held in the atmosphere for cooling.

TABLE 1

| Substrate | | Mg | Zn | Cu | Zr | Si | Fe | Mn | Cr | Ni | Ti | Al |
|---|---|---|---|---|---|---|---|---|---|---|---|---|
| Al Alloy Substrates of Present Invention | 1 | 3.25 | 1.96 | 0.01 | <0.001 | 0.04 | 0.05 | <0.001 | <0.001 | <0.001 | <0.001 | bal. |
| | 2 | 4.94 | 1.56 | 0.01 | <0.001 | 0.04 | 0.06 | <0.001 | <0.001 | <0.001 | <0.001 | bal. |
| | 3 | 4.07 | 1.47 | 0.02 | <0.001 | 0.03 | 0.04 | <0.001 | <0.001 | <0.001 | <0.001 | bal. |
| | 4 | 3.88 | 1.55 | 0.01 | <0.001 | 0.05 | 0.05 | <0.001 | <0.001 | <0.001 | <0.001 | bal. |
| | 5 | 4.05 | 0.62 | 0.02 | <0.001 | 0.03 | 0.05 | <0.001 | <0.001 | <0.001 | <0.001 | bal. |
| | 6 | 4.03 | 2.93 | 0.02 | <0.001 | 0.04 | 0.04 | <0.001 | <0.001 | <0.001 | <0.001 | bal. |
| | 7 | 4.10 | 1.56 | 0.02 | 0.03 | 0.04 | 0.04 | <0.001 | <0.001 | <0.001 | <0.001 | bal. |
| | 8 | 4.02 | 1.52 | 0.01 | 0.19 | 0.04 | 0.05 | <0.001 | <0.001 | <0.001 | <0.001 | bal. |
| | 9 | 3.96 | 1.57 | 0.01 | 0.41 | 0.04 | 0.04 | <0.001 | <0.001 | <0.001 | <0.001 | bal. |
| | 10 | 4.05 | 1.51 | 0.33 | <0.001 | 0.04 | 0.03 | ≲0.001 | <0.001 | <0.001 | <0.001 | bal. |
| | 11 | 4.03 | 1.52 | 0.74 | <0.001 | 0.04 | 0.03 | <0.001 | <0.001 | <0.001 | <0.001 | bal. |
| | 12 | 3.97 | 1.49 | 1.98 | <0.001 | 0.04 | 0.04 | <0.001 | <0.001 | <0.001 | <0.001 | bal. |
| | 13 | 3.16 | 1.47 | 0.74 | <0.001 | 0.03 | 0.04 | <0.001 | <0.001 | <0.001 | <0.001 | bal. |
| | 14 | 4.92 | 1.53 | 0.76 | <0.001 | 0.05 | 0.04 | <0.001 | <0.001 | <0.001 | <0.001 | bal. |
| | 15 | 3.95 | 0.53 | 0.73 | <0.001 | 0.04 | 0.05 | <0.001 | <0.001 | <0.001 | <0.001 | bal. |
| | 16 | 4.06 | 2.87 | 0.77 | <0.001 | 0.02 | 0.02 | <0.001 | <0.001 | <0.001 | <0.001 | bal. |
| | 17 | 4.04 | 1.56 | 0.75 | 0.03 | 0.03 | 0.03 | <0.001 | <0.001 | <0.001 | <0.001 | bal. |
| | 18 | 3.99 | 1.46 | 0.75 | 0.15 | 0.03 | 0.04 | <0.001 | <0.001 | <0.001 | <0.001 | bal. |

TABLE 1-continued

| Substrate | Chemical Composition (weight %) | | | | | | | | | | |
| --- | --- | --- | --- | --- | --- | --- | --- | --- | --- | --- | --- |
| | Mg | Zn | Cu | Zr | Si | Fe | Mn | Cr | Ni | Ti | Al |
| 19 | 4.06 | 1.52 | 0.76 | 0.47 | 0.04 | 0.04 | <0.001 | <0.001 | <0.001 | <0.001 | bal. |
| Al Alloy Substrate AA 5086 | 4.01 | 0.01 | 0.02 | <0.001 | 0.11 | 0.28 | 0.36 | 0.17 | 0.002 | 0.01 | bal. |

Then, the ingot had its upper and lower side surfaces subjected to facing by 10 mm in thickness per each side surface, into a reduced thickness of 580 mm. The ingot was then heated up to 500° C., and the hot ingot was subjected to hot rolling into a hot rolled plate having a thickness of 5 mm. The hot rolled plate was subjected to cold rolling into a cold rolled plate having a thickness of 2 mm. A disc having a diameter of 200 mm was stamped out from the cold rolled plate. In this manner, aluminum alloy substrates Nos. 1-19 according to the present invention and a conventional aluminum alloy substrate Al Alloy AA 5086 were prepared, as shown in Table 1.

The aluminum alloy substrates Nos. 1-19 according to the present invention and Al Alloy AA 5086 were subjected to creep annealing by holding them under a pressure of 1 kg/cm$^2$ and at a temperature of 350° C. for a holding time of 2 hours. The annealed substrates were subjected to rough machining, followed by lapping by a thickness of 0.2 mm to obtain a mirror finish surface. The lapping time until a thickness reduction of 0.2 mm was obtained, and the roughness of the mirror finish surface were measured with respect to each of the substrates. Further measurements were made of the maximum size of intermetallic compounds present in the mirror finish surface, as well as mechanical properties of the substrates. The results of these measurements are shown in Table 2.

It is clearly noted from Table 2 that the aluminum alloy substrates Nos. 1-19 according to the present invention are all superior to the conventional aluminum alloy subtrate Al Alloy AA 5086 in respect of hardness and strength.

This means that the substrates according to the present invention can be lapped into mirror finish surfaces with better surface roughness within shorter surface finishing times than the conventional aluminum alloy substrate, and the sizes of intermetallic compounds in the matrices of the substrates according to the present invention are much smaller than that of the conventional substrate.

Further, in order to evaluate the plating quality of aluminum alloy substrates according to the present invention, the aluminum alloy substrates Nos. 1-19 according to the present invention and the aluminum alloy substrate Al Alloy AA 5086 were subjected to electroless nickel plating. As a result, the substrates Nos. 1-19 according to the present invention all showed better plating quality than the substrate Al Alloy AA 5086. Also, while the substrates Nos. 1-19 according to the present invention had only five or less pinholes formed in their plated surfaces, the substrate Al Alloy AA 5086 had fifteen pinholes formed in its plated surface.

An aluminum alloy substrate according to the present invention may be used together with a conventional aluminum alloy substrate such as Al Alloy AA 5086, in the form of a clad substrate wherein the substrate according to the present invention forms a surface layer disposed over the conventional substrate, on which a film of magnetic recording medium is to be coated.

Examples of Coating the Substrate

Figure 2:
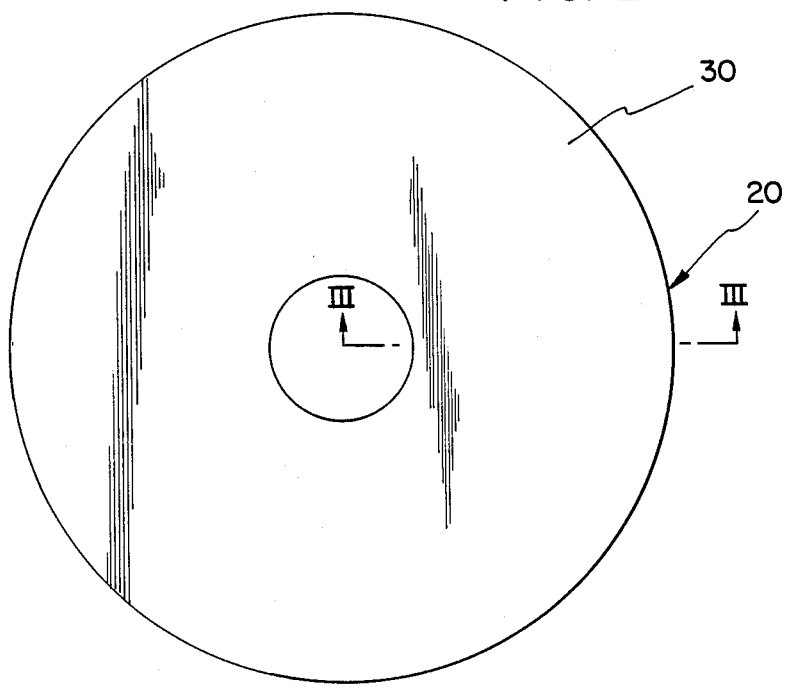
FIG. 2 is a plan view of the magnetic disc.

The substrate 1 of FIG. 1 can be coated by conventional methods to form the magnetic disc 20 of FIG. 2 having the magnetic coating 30 on the outer surfaces of the disc by coating methods such as the following three exemplified methods.

TABLE 2

| Substrate | | Mechanical Properties | | | | Surface Roughness (μm) | Max. Size of Intermetallic Compounds (μm) | Lapping Time (min) |
| --- | --- | --- | --- | --- | --- | --- | --- | --- |
| | | Tensile Strength (kgf/mm$^2$) | Yield Strength (kgf/mm$^2$) | Elongation (%) | Vicker's Hardness | | | |
| Al Alloy | 1 | 27.4 | 13.7 | 27 | 70.3 | 0.02 | 4.7 | 18 |
| Substrate of | 2 | 30.8 | 16.1 | 26 | 82.5 | 0.02 | 4.4 | 16 |
| Present | 3 | 27.5 | 13.9 | 27 | 70.5 | 0.02 | 4.3 | 18 |
| Invention | 4 | 27.7 | 14.1 | 27 | 71.7 | 0.02 | 4.6 | 18 |
| | 5 | 26.7 | 11.8 | 28 | 67.3 | 0.02 | 4.5 | 20 |
| | 6 | 31.9 | 15.5 | 25 | 85.4 | 0.02 | 4.4 | 14 |
| | 7 | 27.5 | 13.7 | 27 | 69.6 | 0.02 | 3.8 | 18 |
| | 8 | 27.6 | 13.8 | 27 | 70.2 | 0.02 | 3.6 | 20 |
| | 9 | 28.1 | 14.0 | 27 | 72.2 | 0.02 | 3.6 | 18 |
| | 10 | 29.3 | 14.9 | 26 | 76.2 | 0.02 | 4.7 | 18 |
| | 11 | 30.4 | 15.8 | 25 | 82.1 | 0.02 | 4.6 | 16 |
| | 12 | 31.0 | 16.5 | 25 | 81.9 | 0.02 | 4.9 | 14 |
| | 13 | 27.1 | 14.4 | 27 | 70.8 | 0.02 | 4.3 | 18 |
| | 14 | 35.8 | 19.9 | 23 | 103.4 | 0.03 | 4.6 | 12 |
| | 15 | 29.7 | 15.1 | 26 | 77.2 | 0.02 | 4.5 | 14 |
| | 16 | 32.5 | 17.2 | 24 | 90.0 | 0.03 | 5.1 | 12 |
| | 17 | 30.1 | 15.6 | 26 | 84.6 | 0.02 | 3.7 | 14 |
| | 18 | 30.7 | 16.0 | 26 | 85.7 | 0.02 | 3.4 | 14 |
| | 19 | 31.1 | 16.2 | 25 | 86.4 | 0.02 | 3.4 | 14 |
| Al Alloy Substrate AA 5086 | | 26.4 | 13.2 | 27 | 64.7 | 0.12 | 14 | 24 |

Figure 3A:
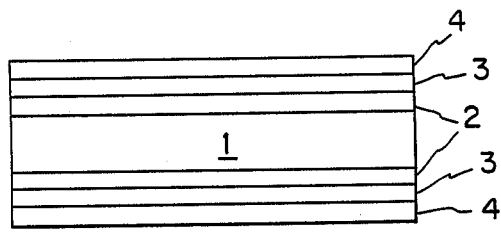
FIGS. 3A, 3B and 3C depict respective cross-sections along line III—III of different magnetic disc construction with the disc of 3A being coated by the plating method, the disc of 3B by the alumetizing method and the disc of 3C by the coating method.

The surface coatings can be applied by a plating method to produce the magnetic disc of FIG. 3A utilizing the sequence of plating steps and product characteristics specified in the following table. The aluminum alloy utilized for the substrate is an alloy composition as specified in the present application.

|  | (1) Substrate | Non-Electrolytic Plating (2) Under-Coating | Spattering (3) Magnetic Material | Coating (4) Protective-Film |
|---|---|---|---|---|
| Material | Al Alloy | Ni—P Plating or Cu Plating | Co—Ni—P, γ-Fe$_2$O$_3$, etc. | SiO$_2$, C,* F-resin**, etc. |
| Thickness | 1.0–2.5 mm | 10–20 μm | 0.05–0.2 μm | 200–700 Å |
| Surface Roughness | <0.03μ Rmax | <0.03μ Rmax | — | — |
| Hardness | 30–80 Hv | 500–600 Hv | 600–1000 Hv | — |

*graphite
**fluorocarbon resin

Figure 3B:
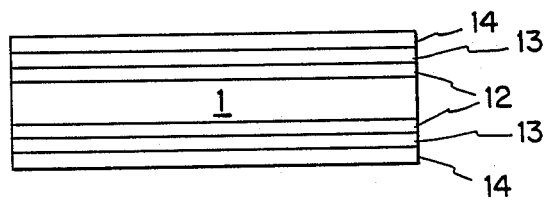

The surface coatings can be applied by an alumetizing method to produce the magnetic disc of FIG. 3B utilizing the sequence of alumetizing steps and product characteristics specified in the following table. The aluminum alloy utilized for the substrate is an alloy composition as specified in the present application.

|  | (1) Substrate | (12) Anode Dioxide-Film | (13) Magnetic Material | (14) Protective-Film |
|---|---|---|---|---|
| Material | Al Alloy | Anode Dioxide-Film | γ-Fe$_2$O$_3$ | SiO$_2$, C,* F-resin**, etc. |
| Thickness | 1.0–2.5 mm | 3–6 μm | 0.05–0.2 μm | 200–700 Å |
| Surface Roughness | — | <0.02μ Rmax | — | — |
| Hardness | 30–80 Hv | 300–400 Hv | 600–1000 Hv | — |

*graphite
**fluorocarbon resin

Figure 3C:
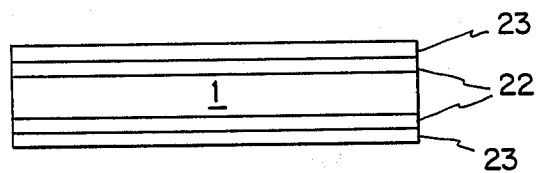

The surface coatings can be applied by a coating method to produce the magnetic disc of FIG. 3C utilizing the sequence of coating steps and product characteristics specified in the following table. The aluminum alloy utilized for the substrate is an alloy composition as specified in the present application.

|  | (1) Substrate | (22)* Chemical Conversion Coating | (23) Magnetic Material |
|---|---|---|---|
| Material | Al Alloy | Chromatic Film, etc. | Resin Containing γ-Fe$_2$O$_3$, etc. |
| Thickness | 1.0–2.5 mm | <0.1μ | 0.5–2 μm |
| Surface Roughness | <0.05μ Rmax | <0.05μ Rmax | — |
| Hardness | 30–80 Hv | — | — |

*This treatment is optional.

While the invention has been described with respect to specific embodiments, it should be clear that various modifications and alterations may be made within the scope of the invention, as defined by the appended claims.

What is claimed is:

1. A method of making a disc substrate for a magnetic disc having a central axial opening comprising working an aluminum alloy to form an aluminum sheet from 1.25 to 5 mm thick and having a surface hardness (Vickers Hardness) of 60–105 and a surface roughness (Rmax) of 0.03 or less, said aluminum alloy consisting essentially of from 3.0 to 5.0 percent Mg, from 0.5 to 3.0 percent Zn, up to 2% Cu, up to 0.5% Zr and the balance Al and inevitable impurities, wherein the inevitable impurities contain not more than 0.10 percent Si, and not more than 0.10 percent Fe, not more than 0.0Mn, not more than 0.01 percent Cr, not more than 0.01 percent Ni, and not more than 0.01 percent Ti, wherein said step of working said aluminum alloy comprises the steps of:

(a) melting said aluminum alloy to provide a molten alloy;

(i) degassing said molten Al alloy by contact with at least one selected from the group consisting of a chlorine gas, a nitrogen gas, and an argon gas, and a degassing flux to provide a degassed molten alloy whereby the gas content in the degassed molten Al alloy is less than 0.20cc/100g Al;

(ii) filtering the degassed molten alloy through a ceramic filter to remove non-metallic inclusions therefrom and to provide a filtered molten alloy;

(b) charging the filtered molten Al alloy into a mold at a temperature of from 690° to 700° C. to form an ingot by direct chill casting;

(c) heating the ingot to a temperature of from 480° to 535° C. to provide a heated ingot, immediately followed by hot rolling said heated ingot to form a hot rolled plate having a thickness of from 3.0 to 9.0 mm;

(d) subjecting the hot rolled plate cold rolling at a reduction ratio of at least 40% into a cold rolled plate;

(e) stamping a disc having two surfaces and a central axial opening from said cold rolled plate;

(f) creep annealing said disc stamped from said cold rolled plate under a pressure of at least 0.25 kg/cm$^2$ and at a temperature of from 200° to 400° C. to provide an annealed disc; and (g) subjecting the annealed disc substrate to rough machining to a thickness of from 1.25 to 5 mm, followed by lapping to obtain a mirror finish surface on both surfaces.

2. The method of claim 1, wherein said aluminum alloy consists essentially of from 0.3 to 2.0 percent Cu.

3. The method of claim 1, wherein said aluminum alloy consists essentially of from 0.02 to 0.05 percent Zr.

4. The method of claim 1, wherein said aluminum alloy also contains from 0.3 to 2.0 percent Cu and from 0.02 to 0.5. percent Zr.

5. The method of claim 1, wherein said aluminum alloy consists essentially of from 3.5 to 4.5 percent Mg from 0.5 to 1.7 percent Zn, and the balance Al and inevitable impurities.

6. The method of claim 1, wherein said aluminum alloy consists essentially of from 3.5 to 4.5 percent Mg, from 0.5 to 1.7 percent Zn, from 0.5 to 1.0 percent Cu, and the balance Al and inevitable impurities.

7. The method of claim 1, wherein said aluminum alloy consists essentially of from 3.5 to 4.5 percent Mg, from 0.5 to 1.7 percent Zn, from 0.05 to 0.2 percent Zr, and the balance Al and inevitable impurities.

8. The method of claim 1, wherein said aluminum alloy consists essentially of from 3.5 to 4.5 percent Mg, from 0.5 to 1.7 percent Zn, from 0.5 to 1.0 percent Cu, from 0.05 to 0.2 percent Zr, and the balance Al and inevitable impurities.

9. The method of claim 1, wherein said disc subjected to said rough machining is subjected to creep annealing at a temperature of from 200° to 350° C. before said finish machining.

10. A disc substrate for magnetic disc having a central axial opening produced in accordance with the method of claim 1.

11. A method of making a disc substrate for a magnetic disc having a central axial opening comprising working an aluminum alloy to form an aluminum sheet from 1.25 to 5 mm thick and having a surface hardness (vickers Hardness) of 60-105 and a surface roughness (Rmax) of 0.03 or less, said aluminum alloy consisting essentially of from 3.0 to 5.0 percent Mg, from 0.5 to 3.0 percent Zn, and the balance Al and inevitable impurities, wherein the inevitable impurities contain not more than 0.10 percent Si, and not more than 0.01 percent Fe, not more than 0.01 Mg, not more than 0.01 percent Cr, not more than 0.01 percent Ni, and not more than 0.01 percent Ti, wherein said step of working said aluminum alloy comprises the steps of:

(a) melting said aluminum alloy to provide a molten alloy;

(i) degassing said molten Al alloy by contact with at least one selected from the group consisting of a chlorine gas, nitrogen gas, and an argon, gas, and a degassing flux to provide a degassed molten alloy whereby the gas content in the degassed molten Al alloy is less than 0.20cc/100g Al;

(ii) filtering the degassed molten Al alloy through a ceramic filter to remove non-metallic inclusions therefrom and to provide a filtered molten alloy;

(b) charging the filter molten Al alloy into a mold at a temperature of from 690° to 700° C. to form an ingot by direct chill casting;

(c) heating the ingot to a temperature of from 480° to 535° C. to provide a heated ingot, immediately followed by hot rolling said heated ingot to form a hot rolled plate having a thickness of from 3.0 to 9.0 mm;

(d) subjecting the hot rolled plate to cold rolling at a reduction ratio of at least 40 % into a cold rolled plate;

(e) stamping a disc having two surfaces and a central axial opening from said cold rolled plate;

(f) creep annealing said disc stamped from said cold rolled plate under a pressure of at least 0.25 kg/cm$^2$ and at a temperature of from 200° to 400° C. to provide an annealed disc; and (g) subjecting the annealed disc substrate to rough machining to a thickness of from 1.25 to 5 mm, followed by lapping to obtain a mirror finish surface on both surfaces.

12. A method of making a magnetic disc having a central axial opening comprising working an aluminum alloy to form an aluminum sheet from 1.25 to 5 mm thick and having a surface hardness (vickers Hardness) of 60–105 and a surface roughness (Rmax) of 0.03 or less, said aluminum alloy consisting essentially of form 3.0 to 5.0 percent Mg, from 0.5 to 3.0 percent Zn, and the balance Al and inevitable impurities, wherein the inevitable impurities contain not more than 0.10 percent Si, and not more than 0.10 percent Fe, not more than 0.01 Mn, not more than 0.01 percent Cr, not more than 0.01 percent Ni, and not more than 0.01 percent Ti, wherein said step of working said aluminum alloy comprises the steps of:

(a) melting said aluminum alloy to provide a molten alloy;

(i) degassing said molten Al alloy by contact with at least one selected from the group consisting of a chlorine gas, a nitrogen gas, and an argon gas, and a degassing flux to provide a degassed molten alloy whereby the gas content in the degassed molten Al alloy is less than 0.20cc/100g Al;

(ii) filtering the degassed molten Al alloy through a ceramic filter to remove non-metallic inclusions therefrom and to provide a filtered molten alloy;

(b) charging the filtered molten Al alloy into a mold at a temperature of from 690° to 700° C. to form an ingot by direct chill casting;

(c) heating the ingot to a temperature of from 480° to 535° C. to provide a heated ingot, immediately followed by hot rolling said heated ingot to form a hot rolled plate having a thickness of from 3.0 to 9.0 mm;

(d) subjecting the hot rolled plate to cold rolling at a reduction ratio of at least 40% into a cold rolled plate;

(e) stamping a disc having two surfaces and a central axial opening from said cold rolled plate;

(f) creep annealing said disc stamped from said cold rolled plate under a pressure of at least 0.25 kg/cm$^2$ and at a temperature of from 200° to 400° C. to provide an annealed disc; and (g) subjecting the annealed disc substrate to rough machining to a thickness of from 1.25 to 5 mm, followed by lapping to obtain a mirror finish surface on both surface; and (h) coating both mirror finished surfaces with a magnetic coating.

13. A magnetic disc having a central axial opening produced in accordance with the method of claim 12.

* * * * *